US011168244B2

(12) United States Patent
Phan et al.

(10) Patent No.: US 11,168,244 B2
(45) Date of Patent: Nov. 9, 2021

(54) COMPOSITIONS FOR ENHANCED OIL RECOVERY

(71) Applicant: ChampionX USA Inc., Sugar Land, TX (US)

(72) Inventors: Tri Phan, Sugar Land, TX (US); Duy Nguyen, Richmond, TX (US); Jenny Phan, Tomball, TX (US); Tzu-ping Hsu, Richmond, TX (US)

(73) Assignee: ChampionX USA Inc., Sugar Land, TX (US)

( * ) Notice: Subject to any disclaimer, the term of this patent is extended or adjusted under 35 U.S.C. 154(b) by 0 days.

(21) Appl. No.: 15/792,108

(22) Filed: Oct. 24, 2017

(65) Prior Publication Data

US 2018/0112122 A1 Apr. 26, 2018

Related U.S. Application Data

(60) Provisional application No. 62/412,919, filed on Oct. 26, 2016.

(51) Int. Cl.
C09K 8/584 (2006.01)
E21B 43/16 (2006.01)

(52) U.S. Cl.
CPC .............. C09K 8/584 (2013.01); E21B 43/16 (2013.01); C09K 2208/12 (2013.01); C09K 2208/28 (2013.01); C09K 2208/32 (2013.01)

(58) Field of Classification Search
CPC .................................................... C09K 8/584
See application file for complete search history.

(56) References Cited

U.S. PATENT DOCUMENTS 5,837,664 A 11/1998 Black
7,629,299 B2 12/2009 Berger et al.
(Continued)

FOREIGN PATENT DOCUMENTS

CA 2590829 A1 12/2007
CN 102587126 B 4/2014
(Continued)

OTHER PUBLICATIONS

Johannes Karl Fink, "Clay Stabilization," Chapter 3, Petroleum Engineer's Guide to Oil Field Chemical and Fluids, 2012, pp. 125-148.
(Continued)

Primary Examiner — William D Hutton, Jr.
Assistant Examiner — Avi T Skaist
(74) Attorney, Agent, or Firm — Kagan Binder, PLLC

(57) ABSTRACT

Disclosed herein are compositions and methods for increasing recovery, or flowback, of hydrocarbon compounds from hydrocarbon-containing subterranean reservoirs. The flowback compositions include an anionic sulfonated surfactant, an amphoteric surfactant, water, and a coupling agent. The flowback compositions convert oil-wet rocks to water-wet, yet exhibit a low tendency of composition components to sorb to the rock. The flowback compositions do not cause formation of emulsions with hydrocarbon compounds within the subterranean environment. The flowback compositions are particularly useful for increasing the yield of hydrocarbons recovered from tight shale reservoirs.

9 Claims, 2 Drawing Sheets

(56) References Cited

U.S. PATENT DOCUMENTS

| | | |
|---|---|---|
| 2007/0079963 A1 | 4/2007 | Yang et al. |
| 2008/0217009 A1 | 9/2008 | Yang |
| 2010/0160187 A1* | 6/2010 | Nguyen .................. C09K 8/50 507/202 |
| 2010/0282467 A1* | 11/2010 | Hutchison ............ C07C 303/06 166/305.1 |
| 2011/0021386 A1* | 1/2011 | Ali ......................... C09K 8/035 507/219 |
| 2013/0081822 A1 | 4/2013 | Han et al. |
| 2013/0261033 A1* | 10/2013 | Nguyen ................. C09K 8/584 507/240 |
| 2014/0338911 A1 | 11/2014 | Dismuke et al. |
| 2015/0068744 A1 | 3/2015 | Welton et al. |
| 2015/0267104 A1 | 9/2015 | Puerto et al. |
| 2015/0275634 A1 | 10/2015 | Nguyen et al. |
| 2015/0329767 A1 | 11/2015 | Vaughn et al. |
| 2016/0083639 A1* | 3/2016 | Xu ......................... C09K 8/605 166/308.2 |
| 2016/0177171 A1 | 6/2016 | Hernández Al Tamirano et al. |
| 2016/0251568 A1* | 9/2016 | Do ........................... C09K 8/86 166/270.1 |
| 2016/0280986 A1* | 9/2016 | Xu ......................... C09K 8/602 |

FOREIGN PATENT DOCUMENTS

| | | |
|---|---|---|
| CN | 104769214 A | 7/2015 |
| EP | 0819422 A1 | 2/1998 |
| GB | 2474017 A | 4/2011 |
| WO | 2013/148760 A1 | 10/2013 |
| WO | 2013/174823 A1 | 11/2013 |
| WO | 2014/176421 A1 | 10/2014 |
| WO | 2016/138072 A1 | 9/2016 |

OTHER PUBLICATIONS

International Search Report for International Application No. PCT/US2017/058001, dated Jan. 9, 2018, 6 pages.

Written Opinion for International Application No. PCT/US2017/058001, dated Jan. 9, 2018, 6 pages.

Official Action in Colombian Application No. NC2019/0004084, dated Mar. 24, 2021, 7 pages.

Columbian Office Action issued in connection with corresponding Colombian patent application No. NC2019/0004084, dated Aug. 30, 2021, 9 pages (Official Copy Only—No English Translation Available).

* cited by examiner

US 11,168,244 B2

COMPOSITIONS FOR ENHANCED OIL RECOVERY

FIELD OF THE INVENTION

The present invention relates to compositions and methods for increased recovery of crude oil from a subterranean hydrocarbon-containing formation.

BACKGROUND

Hydraulic fracturing is a well-stimulation technique in which subterranean rock is fractured by a hydraulically pressurized fracturing fluid typically made by combining water, an hydraulic fracturing proppant (conventionally sand or aluminum oxide), and additive chemicals that modify subterranean flow, subterranean interfacial tension, and/or provide other effects. A hydraulic fracture is formed by pumping the fracturing fluid into a wellbore at a rate sufficient to increase pressure at the target depth to exceed that of the fracture gradient (pressure gradient) of the rock. When the hydraulic pressure is removed from the well, the proppant lodges within the fractures to hold them open. Hydrocarbon compounds such as natural gas and petroleum are recovered via these fractures in the hydrocarbon-containing deep-rock formations. Hydraulic fracturing techniques can be used to form a new well and can also be used to extend the life of an existing conventional oil well.

Chemical additives including surfactants have been added to fracturing fluids in hydraulic fracturing processes to increase recovery of hydrocarbon compounds from subterranean hydrocarbon-containing formations. The surfactants can act to lower the interfacial tension between the fracturing fluid and the oil trapped within the fractures in the reservoir and can change the wettability of the reservoir rock, thereby increasing the yield of hydrocarbon compounds released from the rock fractures. The surfactants can also act to reduce or eliminate condensate formation and concomitant "water blocking" due to high surface tension at or near the well bore region of a subterranean reservoir. However, many conventional surfactants and surfactant blends adsorb substantially onto the rock surfaces, depleting the surfactant quickly at the expense of deeper-lying fracture surfaces. Additionally, many injected surfactants facilitate underground emulsion formation between the hydrocarbon compounds and the fracturing fluid, which retards or prevents recovery of the hydrocarbon compounds.

Further, conventional chemical surfactants and mixtures thereof are often unstable or insoluble in the high temperature and/or high total dissolved solids water sources encountered in some subterranean reservoirs. For example, in some tight shale reservoirs temperatures in excess of 60° C. are encountered; temperatures can be as high as 120° C. Additionally, native underground water, which as a term of art is referred to as "formation fluid" or "connate", is often characterized as having high total dissolved solids, such as about 2 wt % total dissolved solids and as much as about 35 wt % total dissolved solids. In some cases, a substantial portion of the dissolved solids are ionic (one or more salts). In some cases, a substantial portion of the salts are divalent salts including calcium salts, magnesium salts, or a combination thereof. High temperature and high salinity, particularly in the form of high divalent salt concentration, are highly detrimental to the solubility, chemical stability, and thus performance of many surfactants and other materials after injection. Since these detriments are encountered after injection and out of sight of the operator, it is only after injection that an operator may determine that subterranean conditions have caused the surfactants to become unstable or to precipitate, thereby damaging the reservoir for purposes of future hydrocarbon recovery.

Further still, conventional chemical surfactants and mixtures thereof are often unstable or insoluble in concentrations above about 1-10 wt % solids. In some instances, instability at higher concentrations is due to electronic interactions between ionic surfactants employed in the mixtures. Thus, manufacturing and transportation of conventional surfactant mixtures requires the use and transportation of a large amount of water in addition to active ingredients ("actives"). Manufacturing and transportation of large amounts of inactive ingredients is inefficient and wasteful.

Thus, there is a need in the industry for concentrated compositions useful for reducing interfacial tension and increasing yield of hydrocarbons from a subterranean reservoir. There is a need in the industry for concentrated compositions that when injected into a subterranean reservoir reduce the interfacial tension between a fracturing fluid and the oil trapped within the fractured subterranean rock formations in high temperature environments without adsorbing strongly to the rock surfaces and without forming water-oil emulsions. There is a need in the industry for concentrated compositions that are easily and quickly diluted during injection thereof into subterranean environments that include high total dissolved solids, high temperature, or a combination thereof. There is a need in the industry for concentrated compositions that increase the yield of hydrocarbon compounds recovered from fractured subterranean rock formations including high total dissolved solids, high temperature, or a combination thereof. There is a need in the industry for concentrated compositions to improve efficiency of manufacturing and transportation thereof. There is a need in the industry for reduction or elimination of condensate formation and concomitant "water blocking" due to high surface tension at or near the well bore region of a subterranean reservoir.

SUMMARY

Disclosed herein are flowback concentrates and methods for increased flowback (recovery) of crude oil from a subterranean hydrocarbon-containing formation employing the concentrates. The flowback concentrates include about 20 wt % to 50 wt % total surfactant and are characterized as flowable, pumpable, or pourable at temperatures between about 0° C. and 100° C. The flowback concentrates are stable before, during, and after dilution at temperatures of about 60° C. to 120° C. and/or when diluting using water sources having high total dissolved solids. The diluted flowback concentrates are stable during and after injecting into subterranean reservoirs where temperatures of about 60° C. to 120° C. and/or water sources having high total dissolved solids are present.

The concentrates of the invention are useful for increasing the flowback of a hydrocarbon product from a hydrocarbon-bearing subterranean reservoir. In embodiments, the subterranean reservoir is a tight shale reservoir. The compositions comprise, consist essentially of, or consist of (1) a sulfonated anionic surfactant or a mixture thereof (2) an amphoteric surfactant or a mixture thereof (3) a coupling agent or mixture thereof and (4) water, wherein the total amount of coupling agent and water in the compositions is about 50 wt % to 80 wt % and the compositions substantially exclude or exclude carboxylated surfactants. In embodiments, the amphoteric surfactant includes a sulfonate anion.

In embodiments, the molar ratio of sulfonated anionic surfactant to amphoteric surfactant in the flowback concentrate is about 1:2 to 3:1. In embodiments, the weight ratio of total surfactant to solvent in the flowback concentrate, where solvent means water plus coupling agent, is about 1:4 to 1:1. The weight ratio of water to coupling agent in the flowback concentrate is about 1:10 to 1:2. The flowback concentrates are manufactured and transported at total surfactant concentrations of about 20 wt % to 50 wt %, and thus are efficient to manufacture and transport.

In some embodiments, the flowback concentrates further include one or more additives, wherein the additives are selected from clay stabilizers, corrosion inhibitors, scale inhibitors, viscosifying agents, flow back aids, friction reducers, proppants, biocides, or mixtures thereof. In some embodiments, the coupling agent comprises, consists essentially of, or consists of a linear, branched, or cyclic aliphatic alcohol having 1 to 6 carbon atoms, a diol having 1 to 6 carbon atoms, an alkyl ether of and alkylene glycol wherein the alkyl moiety has 1 to 6 carbon atoms, a polyalkylene glycol, or a mixture of two or more thereof. In some embodiments, the coupling agent comprises, consists essentially of, or consists of methanol, ethanol, glycerol, ethylene glycol, or a combination thereof.

In embodiments, the flowback concentrates are characterized as pumpable or pourable at temperatures between about 0° C. and 100° C. In embodiments, the flowback concentrates are stored in a container. In embodiments the flowback concentrates are storage stable for at least 24 hours and as much as two years at temperatures between about 0° C. and 100° C. In embodiments the flowback concentrates are transported, before or after storage, to a location proximal to the wellbore of a subterranean reservoir.

In embodiments the flowback concentrates are combined with a water source to form a flowback injectate. The flowback injectates includes about 10 ppm to 1 wt % total surfactant concentration. The flowback injectates are combined with the water source and subsequently or contemporaneously injected into a subterranean reservoir. When injected, rock contacted by the flowback injectate changes from oil-wettable to water-wettable. Yet the components of the flowback injectates exhibit a low tendency to adsorb onto the rock. The flowback injectates inhibit formation of emulsions in underground fracturing fluid flows. The flowback injectates substantially increase the yield of hydrocarbons obtained from underground reservoirs. The flowback injectates increase yield of hydrocarbons obtained from reservoirs comprising high temperature water sources, high total dissolved solids water sources, or high temperature/high total dissolved solids water sources. The flowback injectates are particularly useful to increase yield of hydrocarbons obtained from tight shale reservoirs.

In some embodiments the flowback concentrate is injected into a subterranean reservoir along with a water source to form a flowback injectate. The flowback injectates comprise about 99 wt % to 99.999 wt % of a water source and about 0.001 wt % to 1 wt % total surfactant, as selected by the user. In some embodiments the water source is a high temperature water source, a high total dissolved solids water source, or a high temperature, high total dissolved solids water source. In embodiments, conditions within the subterranean reservoir include high temperature, high total dissolved solids water sources, or both in at least one subterranean area contacted by the flowback injectate.

Also disclosed herein is a method of increasing recovery of crude oil from a subterranean reservoir, the method comprising: forming a flowback concentrate, the flowback concentrate comprising, consisting essentially of, or consisting of (1) a sulfonated anionic surfactant or a mixture thereof; (2) an amphoteric surfactant or a mixture thereof; (3) a coupling agent or mixture thereof; and (4) water, wherein the total amount of coupling agent and water in the compositions is about 50 wt % to 80 wt % and the compositions substantially exclude or exclude carboxylated surfactants; optionally storing the flowback concentrate for 24 hours to two years, transporting the flowback concentrate to a location proximal to a subterranean reservoir, or both storing and transporting the flowback concentrate; combining the flowback concentrate with a water source to form a flowback injectate; injecting the flowback injectate into the subterranean reservoir; and collecting a hydrocarbon from the subterranean reservoir. In some embodiments, the subterranean reservoir is a tight shale reservoir. In some embodiments, the injecting is into a first wellbore connected to the subterranean reservoir, and the collecting is from a second wellbore that is connected to the subterranean reservoir. In other embodiments, the injecting and the collecting are carried out in the same wellbore. In some embodiments, the water source comprises a temperature of about 60° C. to 250° C., or about 60° C. to 120° C. In some embodiments, the water source comprises about 4 wt % to 30 wt % total dissolved solids. In some embodiments the combining is carried out contemporaneously with the injecting; in other embodiments, the combining is carried out prior to the injecting.

Also disclosed herein is the use of a composition comprising, consisting essentially of, or consisting of (1) a sulfonated anionic surfactant or a mixture thereof; (2) an amphoteric surfactant or a mixture thereof; (3) a coupling agent or mixture thereof; and (4) water to increase the flowback of a hydrocarbon product from a subterranean reservoir. In embodiments, the reservoir is a tight shale reservoir.

Other objects and features will be in part apparent and in part pointed out hereinafter.

DETAILED DESCRIPTION

Definitions

Figure 1A:
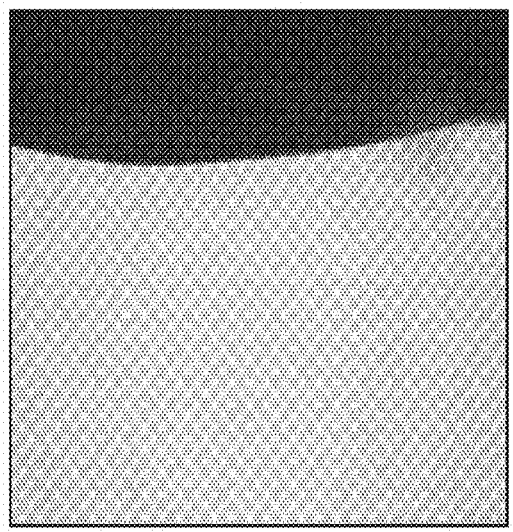
FIG. 1A is a photograph of an oil drop on an oil-saturated shale rock core sample emerged in formation brine.

Unless otherwise defined, all technical and scientific terms used herein have the same meaning as commonly understood by one of ordinary skill in the art. In case of conflict, the present document, including definitions, will control.

As used herein, the term "surfactant" means anionic, nonionic, cationic, and zwitterionic surfactants, wherein enabling descriptions of surfactants are provided in *Kirk-Othmer, Encyclopedia of Chemical Technology*, Third Edition, volume 8, pages 900-912, and in *McCutcheon's Emulsifiers and Detergents*, both of which are incorporated herein by reference for all purposes. As used herein, the term "sulfonated surfactant" means a surfactant including at least one sulfonate anion and the term "carboxylated surfactant" means a surfactant including at least one carboxylate anion. Suitable counterions associated the carboxylate or sulfonate anions are not limited and include e.g. sodium, lithium, potassium, calcium, magnesium, zinc, ammonium, and alkylated ammonium cationic counterions.

As used herein, the term "sulfonated anionic surfactant" or "sulfonated surfactant" means a surfactant having no internal cationic moieties and a single internal sulfonate anionic moiety. Used in this context, "internal" means covalently bonded to the molecule. The sulfonated anionic surfactant is further characterized as having no internal carboxylate anionic moieties and no internal free carboxylic acid moieties. The sulfonated anionic surfactant may have carboxylate ester functionality in some embodiments.

As used herein, the term "amphoteric surfactant" means an ionic surfactant having a net internal charge of zero. Stated differently, an amphoteric surfactant is an electrically neutral compound having formal unit electrical charges of opposite sign. Stated differently, an amphoteric surfactant has at least one internal anionic moiety, where "internal" means the anionic moiety is covalently bonded to the surfactant molecule, at least one internal cationic moiety, where "internal" means the cationic moiety is covalently bonded to the surfactant molecule, and a net internal ionic charge of zero.

As used herein, the term "water source" means water substantially in a liquid state and comprising, consisting essentially of, or consisting of fresh water, tap water, well water, deionized water, distilled water, produced water, municipal water, waste water such as runoff water, "gray" water, or municipal waste water, treated or partially treated waste water, brackish water, or sea water, or a combination of two or more such water sources as determined by context; and present. In embodiments, a water source includes one or more salts, ions, buffers, acids, bases, surfactants, or other dissolved, dispersed, or emulsified compounds, materials, components, or combinations thereof. The term "produced water" refers to a water source that is present within and/or flows from a subterranean reservoir; produced water includes connate unless otherwise specified. Generally, the term "water source" includes all of the following unless otherwise specified or determined by context: water, connate, produced water, water having high total dissolved solids, water having high temperature, and water having both high total dissolved solids and high temperature. The terms "waterbased", "water solution", "aqueous" and the like generally refer to a composition including a water source.

As used herein, the term "high temperature" refers to a water source, a subterranean reservoir, or a combination thereof having a temperature of about 60° C. to 120° C., as specified or determined by context.

As used herein, the term "high total dissolved solids" refers to a water source including at least about 4 wt % solids dissolved therein, and in embodiments up to about 30 wt % solids dissolved therein. In general, "saline" or "salinity" refers to a water source wherein a portion, in some embodiments a substantial portion, the total dissolved solids are salts, as determined by context.

As used herein, the terms "pumpable", "pourable", "flow" "pour point", or like terms referring to a flowback concentrate of the invention means that 10 mL of the flowback concentrate vertically at rest on a substantially horizontal surface in a cylindrical container having dimensions of radius 1 inch and height 2 inches flows observably within about 10 seconds when tipped to a substantially horizontal position. In some embodiments, "pumpable", "pourable", "flow", or like terms referring to a flowback concentrate of the invention means a flowback concentrate having a Brookfield viscosity at 10 s$^{-1}$ of about 5 cP to 1000 cP.

As used herein, the term "stable" as applied to a flowback composition means a kinetically stable composition that absent any force applied, temperature change, or chemical added, is or is capable of being substantially free of coagulation, plating out, precipitation, gross coalescence of phases (conventionally referred to as "separation") or any other evidence of instability for at least about 24 hours at about 20° C. As used herein, the term "storage stable" as applied to a flowback composition means that the composition is stable after at least six months of storage at temperatures between about −25° C. and 60° C.

As used herein, the term "optional" or "optionally" means that the subsequently described component, event or circumstance may but need not be present or occur. The description therefore discloses and includes instances in which the event or circumstance occurs and instances in which it does not, or instances in which the described component is present and instances in which it is not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" the recitation means "1 to 5" and "about 1 to about 5" and "1 to about 5" and "about 1 to 5" unless specifically limited by context.

As used herein, the term "substantially" means "consisting essentially of", as that term is construed in U.S. patent law, and includes "consisting of" as that term is construed in U.S. patent law. For example, a solution that is "substantially free" of a specified compound or material may be free of that compound or material, or may have a minor amount of that compound or material present, such as through unintended contamination or incomplete purification. A "minor amount" may be a trace, an unmeasurable amount, an amount that does not interfere with a value or property, or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

Compositions

The following descriptions of the compositions include descriptions of individual components thereof, wherein any of the individual components are intended to be combined with any other individual components without limitation except where specified otherwise.

Disclosed herein are flowback concentrates and methods for increased flowback (recovery) of crude oil from a subterranean reservoir, which is a hydrocarbon-containing subterranean formation, using the flowback concentrates. In embodiments, the subterranean reservoir is a tight shale reservoir. The flowback concentrates include about 20 wt % to 50 wt % total surfactant and are characterized as flowable, pumpable, or pourable at temperatures between about 0° C. and 100° C. The flowback concentrates of the invention are storage stable for about 24 hours to two years at temperatures of about 60° C. to 120° C. The flowback concentrates remain stable when combined with a water source, where in embodiments the water source is a high temperature water source, a high total dissolved solids water source, or a high temperature/high total dissolved solids water source.

The flowback concentrates comprise, consist essentially of, or consist of (1) a sulfonated anionic surfactant or a mixture thereof; (2) an amphoteric surfactant or a mixture thereof; (3) a coupling agent or mixture thereof; and (4) water, wherein the total amount of coupling agent and water in the compositions is about 50 wt % to 80 wt % and the compositions substantially exclude or exclude carboxylated surfactants. In embodiments, the flowback concentrates include about 20 wt % to 50 wt % total surfactant, wherein the total surfactant means the total weight percent of the sulfonated anionic surfactant plus the amphoteric surfactant. In embodiments, the flowback concentrates include about 20 wt % to 45 wt %, or about 20 wt % to 40 wt %, or about 20 wt % to 35 wt %, or about 20 wt % to 30 wt %, or about 20 wt % to 25 wt %, or about 25 wt % to 50 wt %, or about 30 wt % to 50 wt %, or about 35 wt % to 50 wt %, or about 40 wt % to 50 wt %, or about 45 wt % to 50 wt % total surfactant concentration.

In embodiments, the sulfonated anionic surfactant has the structure $RSO_3X$, wherein R is a hydrophobic moiety selected from linear, branched, alicyclic, aryl, and alkaryl groups having 6 to 50 carbon atoms; and X is a cation independently selected from Na, Li, K, and $NR'_4$ where each R' is independently selected from H or a $C_1$-$C_3$ alkyl group. In embodiments, the sulfonated surfactant is a blend of two or more such compounds. In embodiments the R group of the sulfonated anionic surfactant is an alkyl group including an hydroxyl moiety, and the surfactant is termed an internal olefin sulfonate or hydroxyalkylsulfonate. Hydroxyalkylsulfonates, in some embodiments, are the products of sulfonation of internal olefinic (that is, not α-olefinic) compounds.

Examples of useful sulfonated anionic surfactants include sodium, potassium, lithium, or ammonium salts of alkyl sulfonates such as sodium dodecyl sulfonate, tetramethylammonium hexadecyl sulfonate, and the like; glyceryl ether and aryl analogs of alkyl sulfonates; hydroxyalkylsulfonates having about 12 to 30 carbons such as those sold by Shell Chemicals of The Hague, The Netherlands under the trade names NEODENE® and ENORDET®; and linear or internal olefin sulfonates sold by the Stepan Company of Northfield, Ill. under the trade name BIO-TERGE®.

The amphoteric surfactant, also termed a zwitterionic surfactant, includes at least one internal anionic moiety, at least one internal cationic moiety, and has a net internal charge of zero. In embodiments, the amphoteric surfactant consists essentially of a single internal cation, a single internal anion, and a hydrophobic moiety selected from linear, branched, alicyclic, aryl, and alkaryl groups having 6 to 50 carbon atoms. In embodiments, the amphoteric surfactant excludes internal carboxylate anionic moieties and internal carboxylic acid moieties. In embodiments, the amphoteric surfactant includes a sulfonate anion. In embodiments, the amphoteric surfactant includes at least one internal cationic moiety comprising ammonium or phosphonium; and at least one internal anionic moiety comprising sulfonate, sulfate, oxide, carboxylate, phosphate, phosphite, or phosphonate. In embodiments, the amphoteric surfactant includes at least one internal cationic moiety comprising ammonium or phosphonium; and at least one internal anionic moiety comprising sulfonate. In embodiments, the amphoteric surfactant includes at least one internal hydroxyl group.

Examples of useful amphoteric surfactants include amino acids having a hydrophobic moiety selected from linear, branched, alicyclic, aryl, and alkaryl groups having 6 to 50 carbon atoms. One example of an amino acid surfactant is N—dodecyl—N,N—dimethyl glycine. Another class of useful amphoteric surfactants is trialkylamine oxides including a hydrophobic moiety selected from linear, branched, alicyclic, aryl, and alkaryl groups having 6 to 50 carbon atoms; examples include N,N—dimethyl—N—dodecyl amine oxide, N,N—dimethyl—N—hexadecyl amine oxide, N,N—dimethyl—N—octadecyl amine oxide, and N,N—dimethyl—N—(Z-9-octadecenyl)—N—amine oxide. Another class of useful amphoteric surfactants is betaines, which include one internal carboxylate moiety and one internal ammonium moiety. Representative but nonlimiting examples of betaines include 2-(dodecyldimethylammonio) acetate (CAS No. 683-10-3), cocamidopropyl betaine (2-[3-(dodecanoylamino)propyl-dimethylazaniumyl]acetate), dodecanamidopropyl betaine ({2-[3-(dodecanoylamino)propyl]triazan-2-ium-2-yl}acetate), cetyl betaine (2-[hexadecyl(dimethyl)azaniumyl]acetate), oleamidopropyl betaine ((Z)-(carboxymethyl)dimethyl-3-((1-oxo-9-octadecenyl)amino) propylammonium hydroxide), and caprylamidopropyl betaine (2-[dimethyl-[3-(octanoylamino)propyl]azaniumyl] acetate). Another class of useful amphoteric surfactants is sultaines, which include one internal sulfonate moiety and one internal ammonium moiety (also referred to as sulfobetaines). Examples of sultaines are lauryl sulfobetaine (3-(dodecyldimethylammonio)propane-1-sulfonate), caprylyl sulfobetaine (3-[decyl(dimethyl)azaniumyl]propane-1-sulfonate), myristyl sulfobetaine (3-[dimethyl(tetradecyl) azaniumyl]propane-1-sulfonate), Sulfobetaine 10 (CAS No. 15163-36-7), Sulfobetaine 3-14 (N—tetradecyl—N,N—dimethyl-3-ammonio-1-propanesulfonate), Sulfobetaine 3-10 (N—decyl—N,N—dimethyl-3-ammonio-1-propanesulfonate); alkylether hydroxypropyl sultaines and alkyldimethylhydroxysultaines such as lauryl hydroxysultaine (3-[dodecyl(dimethyl)ammonio]-2-hydroxypropane-1-sulfonate), myristamidopropyl hydroxysultaine (2-hydroxy—N,N—dimethyl—N—(3-((1-oxotetradecyl) amino)propyl)-3-sulfo-, inner salt); and the like. Mixtures of such surfactants having various carbon chain lengths are often sold as products as well; for example, 3-((C10—C16)-alkyldimethylammonio)-2-hydroxypropanesulfonate (CAS No. 72869-77-3) is a mixture of alkylated moieties having an average of 10 to 16 carbons.

In embodiments, the amphoteric surfactant comprises sulfonate moieties. In embodiments, the sulfonated anionic surfactant comprises a hydroxyl moiety. In embodiments, the amphoteric surfactant comprises a hydroxyl moiety. In embodiments, the sulfonated anionic surfactant excludes internal carboxylate anions and carboxylic acid moieties. In embodiments, the amphoteric surfactant excludes internal carboxylate anions and carboxylic acid moieties. In embodiments, the flowback compositions exclude carboxylate anions. In embodiments, the flowback compositions exclude carboxylic acids.

In some embodiments, the coupling agent comprises, consists essentially of, or consists of a linear, branched, or cyclic aliphatic alcohol having 1 to 6 carbon atoms, a diol having 1 to 6 carbon atoms, alkyl ethers of alkylene glycols wherein the alkyl ether moiety has 1 to 6 carbon atoms and the alkylene glycol has 2 to 4 carbons, a polyalkylene glycol wherein the alkylene moiety includes 2 to 4 carbons or a mixture of such glycols; or a mixture of any two or more of these. In some embodiments, the coupling agent comprises, consists essentially of, or consists of methanol, ethanol, propanol, butanol, glycerol, ethylene glycol, ethylene glycol monoalkyl ether wherein the ether moiety comprises 1 to 6 carbon atoms, or a combination of two or more thereof. In some embodiments, the coupling agent consists essentially of ethylene glycol monobutyl ether.

The molar ratio of sulfonated anionic surfactant to amphoteric surfactant in the flowback concentrate is about 1:2 to 3:1; in some such embodiments, the molar ratio of sulfonated anionic surfactant to amphoteric surfactant is about 1:2 to 2.75:1, or about 1:2 to 2.6:1, or about 1:2 to 2.4:1, or about 1:2 to 2.2:1, or about 1:2 to 2:1, or about 1:2 to 1.8:1, or about 1:2 to 1.6:1, or about 1:2 to 1.4:1, or about 1:2 to 1.2:1, or about 1:2 to 1:1, or about 0.6:1 to 3:1, or about 0.7:1 to 3:1, or about 0.8:1 to 3:1, or about 0.9:1 to 3:1, or about 1:1 to 3:1, or about 1.2:1 to 3:1, or about 1.4:1 to 3:1, or about 1.6:1 to 3:1. The weight ratio of total surfactant to solvent in the flowback concentrate, where solvent means water plus coupling agent, is about 1:4 to 1:1, or about 1:3 to 1:1, or about 1:2 to 1:1, or about 1:4 to 1:2, or about 1:4 to 1:3. The weight ratio of coupling agent to water in the flowback concentrate is about 10:1 to 1:1, or about 9:1 to 1:1, or about 8:1 to 1:1, or about 7:1 to 1:1, or about 6:1 to 1:1, or about 5:1 to 1:1, or about 4:1 to 1:1, or about 3:1 to 1:1, or about 2:1 to 1:1, or about 10:1 to 2:1, or about 10:1 to 3:1, or about 10:1 to:1, or about 8:1 to 2:1, or about 6:1 to 2:1, or about 5:1 to 2:1.

By excluding carboxylated surfactants, we have found that the flowback concentrates are pumpable or pourable, and further are shelf stable. By providing the stated ratios of the sulfonated anionic surfactant and amphoteric surfactant, we have found that the flowback concentrates are pumpable or pourable, and further are shelf stable. By providing the stated ratios of total surfactant to solvent, and further providing the stated ratios of water and coupling agent as the solvent system for the flowback concentrates, we have found that the flowback concentrates are pumpable or pourable, and further are shelf stable. In embodiments, the flowback concentrates include one or more of the following characteristics: exclusion of carboxylate anionic surfactants; exclusion of internal carboxylate anionic moieties in the sulfonated anionic surfactant; exclusion of internal carboxylate anionic moieties in the amphoteric surfactant; the molar ratio of sulfonated anionic surfactant to amphoteric surfactant is about 1:2 to 3:1 or any of the subranges recited above; the weight ratio of total surfactant to solvent is about 1:4 to 1:1 or any of the subranges recited above; the weight ratio of coupling agent to water is about 10:1 to 1:1 or any of the subranges recited above.

In embodiments, the flowback concentrates are characterized as pumpable or pourable at temperatures between about 0° C. and 100° C. In embodiments, the flowback concentrates are stored in a container for at least 24 hours and as long as two years. In embodiments the flowback concentrates are storage stable or shelf stable for at least 24 hours and as long as two years at temperatures between about 0° C. and 100° C., for example about 1 week to two years, or about 1 month to two years, or about 6 months to two years, or about 24 hours to 1 year, or about 24 hours to 6 months, or about 24 hours to 1 month, or about 1 month to 1 year, or about 6 months to 1 year. In embodiments the flowback concentrates are transported, before or after storage, to a location proximal to the wellbore of a subterranean reservoir. In embodiments, the flowback concentrates are pumped or poured from a container situated proximal to the wellbore of a subterranean reservoir and subsequently or contemporaneously diluted with a water source and injected into the subterranean reservoir.

The presently disclosed flowback concentrates are shelf stable and may be stored or transported, yet are pumpable or pourable for combining with a water source to form a flowback injectate. The flowback concentrates are combined with a water source to form a flowback injectate. The flowback injectates includes about 10 ppm to 1 wt % (10,000 ppm) total surfactant concentration. The combining with a water source is termed dilution. Dilution may be suitably carried out using any known technique available to the skilled artisan for diluting concentrated surfactant compositions prior to or contemporaneously with injection into a subterranean reservoir. For example, static or dynamic mixers are usefully employed along with a source of water to combine a flowback concentrate with e.g. connate, surface water, sea water, purified water, or a produced water flowing back from a subterranean reservoir. It is a feature of the flowback concentrates of the invention that such dilution is easily accomplished: most concentrated surfactant compositions, that is, where solids are 20 wt % and above, form gels or thick, viscous and even paste-like consistencies that are difficult to handle and particularly difficult to dilute rapidly. The flowback concentrates are stable and flowable (and/or pumpable or pourable) at temperatures between 0° C. and 100° C. and thus are advantageously mixed with a water source immediately prior to, or contemporaneously with, injection of the resulting flowback injectate into the subterranean reservoir. A homogenous flowback injectate is easily formed with simple dilution and mixing; no extraordinary equipment or technique (e.g. high shear, high efficiency mixing, etc.) is needed to dilute and inject the flowback injectates.

The flowback injectates are combined with the water source and subsequently or contemporaneously injected into a subterranean reservoir. The flowback injectates comprise about 99 wt % to 99.999 wt % of a water source and about 0.001 wt % to 1 wt % total surfactant, as selected by the user. In some embodiments the water source is a high temperature water source, a high total dissolved solids water source, or a high temperature, high total dissolved solids water source. In embodiments, conditions within the subterranean reservoir include high temperature, high total dissolved solids water sources, or both in at least one subterranean area contacted by the flowback injectate.

When injected, rock contacted by the flowback injectate changes from oil-wettable to water-wettable. For example, the contact angle of an oil drop on an oil-saturated rock surface is 0°; by contacting the oily rock surface with a flowback injectate, the contact angle of an oil drop on the contacted rock surface is changed to about 60° to 100°, or about 60° to 95°, or about 60° to 90°, or about 70° to 100°, or about 80° to 100°, or about 70° to 90°, or about 80° to 90°. Yet the components of the flowback injectates exhibit a low tendency to adsorb onto the rock, which means that the surfactant is not rapidly depleted from the injectate as it flows within the subterranean reservoir. The flowback injectates do not contribute to formation of crude oil emulsions and actually inhibit formation of emulsions in underground fracturing fluid flows, whereas oil/water and water/oil emulsions are commonly formed when injectates comprising surfactants are combined with produced water and crude oil beneath the surface of the earth. The flowback injectates substantially increase the yield of hydrocarbons obtained from underground reservoirs. The flowback injectates increase yield of hydrocarbons obtained from reservoirs comprising high temperature water sources, high total dissolved solids water sources, or high temperature/high total dissolved solids water sources.

The presently disclosed flowback compositions, wherein "flowback compositions" means flowback concentrates, flowback injectates, or both as determined by context, have a highly desirable balance of performance attributes for enhancing oil recovery in tight shale reservoirs such as those exploited in hydraulic fracturing. The flowback injectates alter the wettability of the reservoir rock from oil-wet to water-wet, while exhibiting low adsorption to the rock itself so as to minimize the rate of surfactant depletion as the injectate proceeds to flow within the subterranean reservoir. The presently disclosed flowback injectates also impart low interfacial tension to water sources comprising high salinity and/or total dissolved solids of up to about 30 wt %, yet prevent formation of emulsions with the hydrocarbon products that are the target of the recovery operation. Finally, the presently disclosed flowback injectates are stable within the reservoir while exhibiting all of the foregoing properties. The aqueous environment within tight shale reservoirs can include high temperature, high total dissolved solids, or both.

Despite the harsh environmental conditions and narrow channels present in tight shale reservoirs, and despite the inherently unpredictable behavior of surfactant mixtures, we have found that the disclosed flowback injectates provide highly desirable performance attributes for recovery of hydrocarbon compounds from hydrocarbon-containing subterranean fractured rock formations. This performance is added to the beneficial performance of flowback concentrates which are pumpable or pourable and easily combined with a water source to form the Suitable monomeric surfactants employed in the flowback compositions comprise, consist essentially of, or consist of an anionic group and one or more linear, branched, alicyclic, aromatic, or alkaryl moiety having 6 to 20 carbons, such as 8 to 20, 10 to 20, 12 to 20, 14 to 20, 10 to 18, 10 to 16, or 10 to 14 carbon atoms, or an average of 10, 11, 12, 13, 14, 15, 16, 17, or 18 carbon atoms as determined by any averaging method known to those of skill. Examples of suitable monomer surfactants include linear or branched alkylbenzene sulfonates and mixtures thereof, linear or branched alkyl sulfonates or mixtures thereof, linear or branched alkyl ether sulfonates and mixtures thereof, linear or branched alkyl phosphonates and mixtures thereof, linear or branched alkylbenzene carboxylates and mixtures thereof, linear or branched alkyl carboxylates and mixtures thereof, linear or branched alkyl ether carboxylates and mixtures thereof, combinations of two or more of the foregoing, and the like.

The monomer surfactant employed in the flowback compositions is a conventional water dispersible or water soluble anionic surfactant or a mixture of two or more thereof. Any or all of the following may be aspects of the monomer surfactant and therefore combinable without limitation, and further combinable with any other components of the flowback compositions as described herein including specific recitations of dimer surfactant mixtures with monomer surfactants. In embodiments, the monomer surfactant comprises sulfonate moieties. In embodiments, the monomer surfactant comprises sodium sulfonate moieties. In embodiments, the monomer surfactant comprises aromatic functionality. In embodiments, the monomer surfactant includes a sulfonate group and an alkyl group having 10 or more carbon atoms. In embodiments, the hydrophobic group is an alkaromatic group.

In some embodiments, a sulfonated anionic surfactant and an amphoteric surfactant are selected as a pair for addition to the flowback concentrate. In some such embodiments, the surfactant pair is selected to include the same or substantially the same hydrophilic portions, the same or substantially the same hydrophobic portions, or the same or substantially the same hydrophilic and hydrophobic portions. Thus, for example, an sulfonated anionic surfactant having an linear C12 chain (lauryl or dodecyl) and an hydroxyl group bonded to the dodecyl moiety is advantageously paired with lauryl hydroxysultaine, or 3-[dodecyl(dimethyl) ammonio]-2-hydroxypropane-1-sulfonate.

Optionally, one or more demulsifiers are added to improve the ability of the flowback injectates to prevent emulsions from forming within the subterranean reservoir. Where present, the demulsifiers are selected from the group comprising, consisting essentially of, or consisting of polyethylenimine alkoxylates, alkoxylated alkylphenol formaldehyde resins, alkoxylated amine-modified alkylphenol formaldehyde resins, ethylene oxide/propylene oxide copolymers, crosslinked ethylene oxide/propylene oxide copolymers, and mixtures of these. Where employed, the demulsifier is present in the flowback concentrates at about 0.01 wt % to 5 wt % based on the total weight of the flowback concentrate, for example about 0.05 wt % to 5 wt %, or about 0.1 wt % to 5 wt %, or about 0.2 wt % to 5 wt %, or about 0.3 wt % to 5 wt %, or about 0.4 wt % to 5 wt %, or about 0.5 wt % to 5 wt %, or about 0.6 wt % to 5 wt %, or about 0.7 wt % to 5 wt %, or about 0.8 wt % to 5 wt %, or about 0.9 wt % to 5 wt %, or about 1.0 wt % to 5 wt %, or about 0.01 wt % to 4.5 wt %, or about 0.01 wt % to 4.0 wt %, or about 0.01 wt % to 3.5 wt %, or about 0.01 wt % to 3.0 wt %, or about 0.01 wt % to 2.5 wt %, or about 0.01 wt % to 2.0 wt %, or about 0.01 wt % to 1.5 wt %, or about 0.01 wt % to 1.0 wt %, or about 0.5 wt % to 4 wt %, or about 0.5 wt % to 3 wt %, or about 0.5 wt % to 2 wt % based on the total weight of a flowback concentrate.

The water source employed to form the flowback compositions comprises, consists essentially of, or consists of water. The water source comprises 0 wt % to about 30 wt % total dissolved solids, for example about 100 ppm to 30 wt %, about 1 wt % to 30 wt %, or even about 4 wt % to 30 wt % total dissolved solids. In some embodiments, the water source consists essentially of water; this is most likely to be true with regard to the flowback concentrate compositions. In some embodiments, the water source is produced water; this is most likely to be true with regard to flowback injectate compositions. The amount of the water source employed in the flowback compositions, including but not limited to the amount of water itself, is directed by the total actives desired in the flowback composition, the presence or substantial exclusion of any coupling agents present in the flowback concentrate, and the total solids present in the water source employed.

Suitable coupling agents optionally employed in the flowback compositions of the invention comprise, consist essentially of, or consist of water miscible compounds and mixtures of two or more water miscible compounds, wherein the compounds are liquid at temperatures above 0° C. or lower. The coupling agents do not destabilize the flowback compositions. In some embodiments, the coupling agents increase stability of the flowback compositions. In some embodiments, particularly at certain ratios of surfactants and certain ratios of water, coupling agent, and total surfactant, the coupling agents provide both shelf stability of the flowback concentrates and also impart pourability, pumpability, or flow to the flowback concentrates at temperatures of about 0° C. and up to 100° C. In many embodiments, the coupling agent is fully miscible with water; that is, all possible coupling agent:water ratios may be formed without phase separation. In other embodiments, the coupling agent is miscible with water at least up to about 20:1 water:coupling agent by volume, or about 10:1, about 9:1, about 8:1, about 7:1, about 6:1, about 5:1, about 4:1, about 3:1, about 2:1, about 1:1, about 1:2, about 1:3, about 1:4, about 1:5, about 1:6, about 1:7, about 1:8, about 1:9, about 1:10, about 1:20 water:coupling agent by volume, or ranges between any of these two ratios, such as between about 20:1 and 1:20, between 5:1 and 2:1, and the like.

Suitable coupling agents comprise, consist essentially of, or consist of linear, branched, or cyclic aliphatic alcohols having 1 to 6 carbon atoms, diols having 1 to 6 carbon atoms, alkyl ethers of alkylene glycols wherein the alkyl moiety has 1 to 6 carbon atoms (e.g., ethylene glycol mono-n-butyl ether), polyalkylene glycols, and mixtures thereof. Also useful as coupling agents are glycol and glycerol based acetals and ketals, such as those formed from the condensation of e.g. glycerol with formaldehyde, acetone, or oxocarboxylic acids, semialdehydes, and esters thereof such as levulinic acid or an alkyl levulinate.

The total amount of coupling agents included in the flowback compositions is about 0 wt % to 20 wt % based on the total weight of a flowback concentrate; that is, the coupling agent may or may not be present in a flowback composition. Thus in some embodiments, the flowback compositions of the invention exclude or substantially exclude a coupling agent. In other embodiments, the flowback compositions include, for example, about 0.2 wt % to 20 wt % of a coupling agent, based on the total weight of the flowback concentrate, or about 0.5 wt % to 20 wt %, or about 1.0 wt % to 20 wt %, or about 2.0 wt % to 20 wt %, or about 3.0 wt % to 20 wt %, or about 4.0 wt % to 20 wt %, or about 5.0 wt % to 20 wt %, or about 6.0 wt % to 20 wt %, or about 7.0 wt % to 20 wt %, or about 8.0 wt % to 20 wt %, or about 9.0 wt % to 20 wt %, or about 10 wt % to 20 wt %, or about 0.1 wt % to 19 wt %, or about 0.1 wt % to 18 wt %, or about 0.1 wt % to 17 wt %, or about 0.1 wt % to 16 wt %, or about 0.1 wt % to 15 wt %, or about 0.1 wt % to 14 wt %, or about 0.1 wt % to 13 wt %, or about 0.1 wt % to 12 wt %, or about 0.1 wt % to 11 wt %, or about 0.1 wt % to 10 wt %, or about 5 wt % to 20 wt %, or about 5 wt % to 15 wt % based on the total weight of a flowback concentrate. The coupling agent is generally not included in the list of "actives" but is present in the concentrate to promote and increase storage stability of the flowback concentrates as well as facilitate stability of the composition during dilution of the concentrates to flowback injectates without incurring instabilities such as insolubility of an active component during the dilution. Additionally, in some embodiments the coupling agents further suppress the freezing point of the composition which is advantageous for winter storage and transportation purposes. Finally, in some embodiments the coupling agents reduce the viscosity of a flowback concentrate, increasing the pumpability and pourability of the concentrate over a range of field use temperatures.

As described above, additives optionally included in the flowback compositions include clay stabilizers, corrosion inhibitors, scale inhibitors, viscosifying agents, flow back aids, friction reducers, proppants, biocides, or mixtures thereof or in various combinations depending on the chemical and physical attributes of the subterranean reservoir addressed and optimization by the operator in such environments.

Suitable clay stabilizers employed in the flowback compositions comprise, consist essentially of, or consist of quaternary ammonium salt polymers having weight average molecular weights of about 500 g/mol to 10,000 g/mol, choline chloride, inorganic salts, and mixtures thereof. Inorganic salts usefully employed as clay stabilizers include $KCl$, $CaCl_2$, and $MgCl_2$. Additional clay stabilizers useful in the emulsions of the invention are listed at http://booksite.elsevier.com/samplechapters/9780123838445/9780123838445.pdf.

The amount of clay stabilizer employed in the emulsions of the invention totals about 1 wt % to 25 wt % based on the total weight of a flowback concentrate, for example about 2 wt % to 25 wt %, or about 3 wt % to 25 wt %, or about 4 wt % to 25 wt %, or about 5 wt % to 25 wt %, or about 6 wt % to 25 wt %, or about 7 wt % to 25 wt %, or about 8 wt % to 25 wt %, or about 9 wt % to 25 wt %, or about 10 wt % to 25 wt %, or about 11 wt % to 25 wt %, or about 12 wt % to 25 wt %, or about 13 wt % to 25 wt %, or about 14 wt % to 25 wt %, or about 15 wt % to 25 wt %, or about 1 wt % to 24 wt %, or about 1 wt % to 23 wt %, or about 1 wt % to 22 wt %, or about 1 wt % to 21 wt %, or about 1 wt % to 20 wt %, or about 1 wt % to 19 wt %, or about 1 wt % to 18 wt %, or about 1 wt % to 17 wt %, or about 1 wt % to 16 wt %, or about 1 wt % to 15 wt %, or about 5 wt % to 20 wt %, or about 10 wt % to 20 wt % based on the total weight of a flowback concentrate.

In some embodiments, the flowback compositions include one or more corrosion inhibitors, scale inhibitors, viscosifying agents, flow back aids, friction reducers, proppants, biocides, or mixtures thereof or in various combinations depending on the chemical and physical attributes of the subterranean reservoir addressed and optimization by the operator in such environments. Such additives include those oil field additives conventionally used in hydraulic fracturing or post-primary fracturing of subterranean hydrocarbon-containing formations. In some embodiments, the additives are added to the flowback concentrates, and the resulting concentrates are stable, or even storage stable. In other embodiments, the additives are not added to the flowback concentrate, but rather are added to the subterranean reservoir contemporaneously with dilution of the flowback concentrate to form a flowback injectate, or are added to the flowback injectate after the injectate is formed.

Suitable corrosion inhibitors include sulfur-functional compounds such as mercaptoethanol, or tertiary amino compounds such as triazine as well as other mercapto and tertiary amino functionalized compounds and polymers. Suitable scale inhibitors include phosphonate compounds and acrylated polymers. In some embodiments, one or more such additives are present in an amount that is less than 1 percent by weight of a flowback concentrate. In other embodiments, each one or more additives are present at about 1 ppm to 500 ppm in a flowback injectate, for example about 2 ppm to 400 ppm, or about 3 ppm to 300 ppm, or about 4 ppm to 200 ppm, or about 5 ppm to 100 ppm of one or more additives.

The flowback compositions of the invention are stable. In some embodiments, the flowback compositions, such as the flowback concentrates, are storage stable. In some such embodiments, the flowback concentrates are storage stable for about 24 hours and up to two years, or about 6 months to one year at temperatures between about 0° C. and 100° C., or about 10° C. to 100° C., or about 20° C. to 100° C., or about 0° C. to 90° C., or about 0° C. to 80° C., or about 0° C. to 70° C., or about 0° C. to 60° C., or about 0° C. to 50° C., or about 0° C. to 40° C., or about 0° C. to 30° C., or about 10° C. to 60° C., or about 10° C. to 50° C., or about 10° C. to 40° C.

The flowback compositions are suitably combined as flowback concentrates for storage and transportation, wherein a flowback injectate is prepared for subterranean injection by dilution of the flowback concentrate with a water source. In some such embodiments, the total concentration of surfactant in a flowback composition is referred to as the concentration of "actives" in the composition. The weight ratio of actives:coupling agent in any one flowback composition remains substantially constant regardless of the total weight or volume comprising the actives. The weight ratios of actives and other components of the flowback compositions recited above relate to both flowback concentrates and flowback injectates unless otherwise specified.

In embodiments, the flowback injectates include about 0.001 wt % (10 ppm) to 1 wt % total actives based on the weight of the injectate. In embodiments, the injectates comprise, consist essentially of, or consist of about 0.001 wt % to 1.00 wt % actives in a water source, for example about 0.005 wt % to 1.00 wt %, or about 0.01 wt % to 1.00 wt %, or about 0.02 wt % to 1.00 wt %, or about 0.03 wt % to 1.00 wt %, or about 0.04 wt % to 1.00 wt %, or about 0.05 wt % to 1.00 wt %, or about 0.06 wt % to 1.00 wt %, or about 0.07 wt % to 1.00 wt %, or about 0.08 wt % to 1.00 wt %, or about 0.09 wt % to 1.00 wt %, or about 0.10 wt % to 1.00 wt %, or about 0.001 wt % to 0.90 wt %, or about 0.001 wt % to 0.80 wt %, or about 0.001 wt % to 0.70 wt %, or about 0.001 wt % to 0.60 wt %, or about 0.001 wt % to 0.50 wt %, or about 0.001 wt % to 0.40 wt %, or about 0.001 wt % to 0.30 wt %, or about 0.001 wt % to 0.20 wt %, or about 0.001 wt % to 0.10 wt %, or about 0.005 wt % to 0.50 wt %, or about 0.005 wt % to 0.40 wt %, or about 0.005 wt % to 0.3 wt %, or about 0.005 wt % to 0.2 wt %, or about 0.005 wt % to 0.1 wt %, or about 0.01 wt % to 0.2 wt %, or about 0.01 wt % to 0.10 wt % actives in a water source.

Methods

The following descriptions of the methodology include descriptions of individual actions, wherein any of the individual actions are intended to be combined with any other individual actions without limitation except where specified otherwise. Further, the methods as described below are intended to be combined with the use of any of the foregoing compositions, without limitation except where specifically limited or limited by context.

In embodiments, the components of the composition are combined in any order and using any method known to those of skill in forming admixtures. Flowback concentrates are suitably formed by combining the components of the compositions described above in any order to result in a concentrate having about 20 wt % to 50 wt % actives, further wherein the concentrates are pourable or pumpable to enable easy dilution in the field. A flowback concentrate is combined with a water source to form a flowback injectate. In some embodiments, one or more additional components are added to the concentrate, or to the injectate for purposes of hydraulic fracturing. Such additional components may include, for example, proppants comprising or consisting essentially of sand or aluminum oxide, pH adjustment agents such as mineral acids or bases, or other additives incorporated by the operator for use in the specific subterranean reservoir from which a hydrocarbon is being recovered, and/or in conjunction with the specific step being carried out in the recovery of the hydrocarbon. In other embodiments, one or more such additives are included in the concentrate instead, and thus are not added by the operator in the field. The dilution of the flowback concentrate to form the flowback injectate is accomplished using a water source; in some embodiments the water source comprises, consists essentially of, or consists of produced water.

The flowback injectate is injected into a subterranean hydrocarbon containing fractured rock formation, or reservoir, where it results in increased recovery of hydrocarbon compounds from the subterranean hydrocarbon-containing formations. In some embodiments, the water source, the subterranean environment, or both are high temperature, include high total dissolved solids, or both. In some embodiments, the flowback concentrate is combined with a water source and any desired additives to produce a flowback injectate contemporaneously with one or more subterranean injection processes; in other embodiments the combining is prior to injecting. Injection of the flowback injectates results in increased recovery of hydrocarbon compounds from tight shale reservoirs. In embodiments, the tight shale reservoirs are characterized by one or more of low permeability, low porosity, high temperature, high total dissolved solids, and in particular high divalent cation content of ambient water (present naturally in the reservoir) or produced water within the reservoir. The injecting is carried out contemporaneously with hydraulic fracturing of the subterranean rock, or after the fracturing is complete. Where the injecting is contemporaneous with the hydraulic fracturing, the injectate includes a proppant as an additive.

One method of the invention comprises, consists essentially of, or consists of forming a flowback concentrate and storing the concentrate for a period of about 1 day to two years, followed by diluting a flowback concentrate with a water source to form a flowback injectate. Another method includes injecting a flowback injectate into a well which is in contact with a subterranean hydrocarbon-containing formation, followed by collecting one or more hydrocarbon compounds from the well. The flowback injectate is effective for lowering the interfacial tension between the injectate and the hydrocarbon compounds trapped within the formation. The flowback injectate is that effective for changing the wettability of the subterranean hydrocarbon-containing formation. The flowback injectate is effective to increase the rate, the total amount, or both the rate of recovery and the total amount of hydrocarbon compounds recovered from the subterranean hydrocarbon-containing formation into which it is injected.

The methods of the invention optionally include adding one or more additives to the flowback concentrate or the flowback injectate. The additives are added prior to, or contemporaneously with injection of the flowback injectate into a subterranean reservoir. In some embodiments, produced water is contacted with a flowback concentrate of the invention to form a flowback injectate, wherein the produced water is high temperature. In some embodiments, the produced water has high total dissolved solids. In some embodiments, at the target (injectable) volume the produced water is about 90% to 99.999% of the flowback injectate volume, or about 91% to 99.999%, or about 92% to 99.999%, or about 93% to 99.999%, or about 94% to 99.999%, or about 95% to 99.999%, or about 96% to 99.999%, or about 97% to 99.999%, or about 90% to 99.99%, or about 90% to 99.9%, or about 90% to 99%, or about 90% to 98%, or about 92% to 99.9%, or about 94% to 99.9%, or about 95% to 99.9% of the flowback injectate volume. The flowback injectate optionally includes one or more additives as described above.

The flowback injectates of the invention are effective to change the wettability of subterranean rock, coated or even saturated with hydrocarbon compounds, from oil-wet to water-wet, or from mixed-wet to water-wet. Wettability is determined by measuring contact angle of a fracturing fluid on oil-saturated rock. In some embodiments, the flowback injectates of the invention result in a contact angle of less than 90° when contacted with rock previously soaked in hydrocarbon compounds such as crude oil products. In some embodiments, after about 1 second of contact with rock previously soaked in hydrocarbon compounds, contact angle of a flowback injectate of the invention is observed to be 70° or less, such as about 5° to 70°, or about 10° to 70°, or about 20° to 70°, or about 30° to 70°, or about 40° to 70°, or about 5° to 65°, or about 5° to 60°, or about 5° to 55°, or about 5° to 50°, or about 5° to 45°, or about 10° to 60°, or about 10° to 50°, or about 20° to 50°, or about 30° to 50°. In some embodiments, after about 10 seconds of contact with rock previously soaked in hydrocarbon compounds, contact angle of a flowback injectate of the invention is observed to be 50° or less, such as about 5° to 50°, or about 10° to 50°, or about 20° to 50°, or about 30° to 50°, or about 5° to 45°, or about 5° to 40°, or about 5° to 35°, or about 10° to 35°, or about 10° to 30°, or about 20° to 40°, or about 25° to 40°. In some embodiments, after about 60 second of contact with rock previously soaked in hydrocarbon compounds, contact angle of a flowback injectate of the invention is observed to be 40° or less, such as about 5° to 40°, or about 7° to 40°, or about 10° to 40°, or about 15° to 40°, or about 20° to 40°, or about 5° to 35°, or about 5° to 30°, or about 5° to 25°, or about 5° to 20°, or about 7° to 30°, or about 7° to 25°, or about 10° to 25°.

In some embodiments, the subterranean hydrocarbon-containing formation addressed by the flowback injectates of the invention is a sandstone reservoir or a carbonate reservoir. In some embodiments, the injection of flowback injectate is carried out after hydraulic fracturing of the well. In other embodiments, the injection of flowback injectate is carried out during hydraulic fracturing of the well. The methods of the invention are particularly useful when the subterranean reservoir has one or more of the following properties: low permeability, low porosity, oil-wet wettability, high temperature, and/or high total dissolved solids water sources, and a high concentration of divalent cations in the connate or produced water that flows back after fracturing processes are complete.

The flowback compositions of the invention are also suitably employed in one or more steam assisted gravity drainage (SAGD) processes. SAGD is an enhanced oil recovery technology for producing heavy crude oil and bitumen. It is an advanced form of steam stimulation in which a pair of parallel horizontal wells are drilled into a subterranean reservoir, one a few meters above the other. High pressure steam is continuously injected into the upper wellbore to heat the oil and reduce its viscosity, causing the heated oil to drain into the lower wellbore, where it is pumped out. In such processes, the flowback injectates of the invention are usefully injected along with the steam to affect subterranean wettability, surface tension, and the like.

Having described the invention in detail, it will be apparent that modifications and variations are possible without departing from the scope of the invention defined in the appended claims. The following non-limiting examples are provided to further illustrate the present invention.

EXPERIMENTAL

Example 1

A flowback concentrate was formed by combining 16.59 wt % of a C15-C20 olefin sulfonate sodium salt and 7.18 wt % lauryl hydroxyl sultaine (23.77 wt % total actives) in a 4.5:1 wt:wt mixture of ethylene glycol monobutyl ether: water. The concentrate was observed to be stable. Properties measured for the flowback concentrate are listed in Table 1.

TABLE 1

| Properties of the 23.77 wt. % actives flowback concentrate | |
|---|---|
| Property | Value |
| Specific Gravity | 1.01 (15° C.) |
| Physical State/Form, 23° C. | Liquid |
| Appearance | Yellow, transparent |
| Odor | No odor |
| Pour Point | −15° C. |
| Kinematic Viscosity by Brookfield − II + viscometer | 6.9 cP (40° C.) |
| Reid Vapor Pressure | 0.76 psi @ 38° C. |
| Water Solubility | Miscible |
| Neat pH | 10 |

An aliquot of the flowback concentrate was diluted to 0.13 wt % actives (combination of the two surfactants), by adding Woodford synthetic brine (1.37 wt % total of a combination of the following salts dissolved in water (in weight %): 0.91% KCl, 0.02% CaCl2, 0.01% MgCl2, 0.01% BaCl2, 0.01% Na2SO4, 0.01% NaBr, 0.4% NaCl) followed by stirring, to result in a flowback injectate. The injectate was heated to 104° C. and exhibited no observable precipitation and other signs of phase separation or instability. A composition that remains transparent under these conditions with no visible cloudiness or other signs of phase separation is considered to have sufficient aqueous stability to be used as an injectate for increasing flowback of crude oil in a tight shale reservoir or other high-temperature oil recovery operation.

Example 2

Woodford reservoir rock core chips were immersed in Woodford oil (a crude oil mixture) for at least 3 days to achieve oil wet status. Excess oil was wiped from the chips and the chips were subjected to contact angle analysis. A Rame-Hart Automated Goniometer was employed to measure the contact angle (sessile drop) of the Woodford oil on the surface of the rock core chip while the chip was immersed in Woodford synthetic brine at room temperature (23° C.). The contact angle was observed to be 0°: that is, the oil completely wet out the rock core chip surface. FIG. 1A is a photograph of the oil drop as applied to the oil-imbibed rock surface.

Figure 1B:
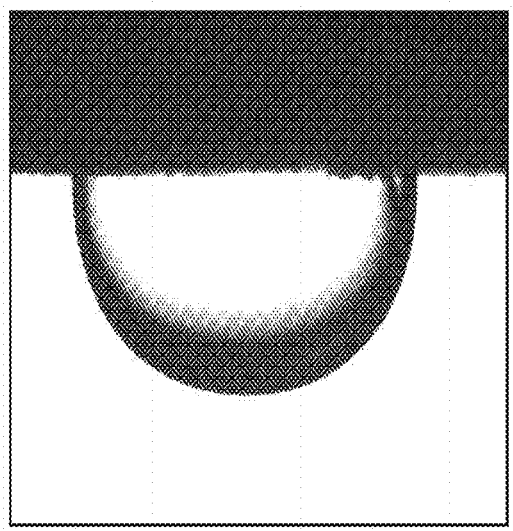
FIG. 1B is a photograph of an oil drop on an oil-saturated shale rock core sample emerged in formation brine, wherein the rock was contacted with a flowback injectate of the invention prior to applying the oil drop to the sample surface.

The oil-saturated chips were then treated with the flowback injectate described above by immersing the oil-saturated chips in the injectate for 1 day. The chips were wiped dry and the contact angle analysis was repeated as described above. The contact angle was observed to be 91°. FIG. 1B is a photograph of the oil drop as applied to the oil-imbibed rock surface after the treatment with the flowback injectate.

Example 3

Interfacial tension of the Woodford synthetic brine with Woodford oil was measured using a spinning drop tensiometer. The untreated brine had an interfacial tension with the oil of 19.7 mN/m. The measurement was repeated with the injectate (0.13 wt % actives of the concentrate of Example 1). The injectate had an interfacial tension with the oil of 0.328 mN/m.

Example 4

Woodford reservoir rock core plugs were weighed, saturated with Woodford oil (a crude hydrocarbon compound mixture) and stored for at least 7 days at 700 psi to achieve oil wet status. Then excess oil was wiped from the plugs, and the plugs were reweighed; the density of the oil was determined in order to calculate the volume of oil taken up by the rock cores. The cores were then placed with all faces open in glass imbibition cells having precision graduations in 0.1 mL. For each of the following tests, two rock core plugs were tested.

Figure 2:
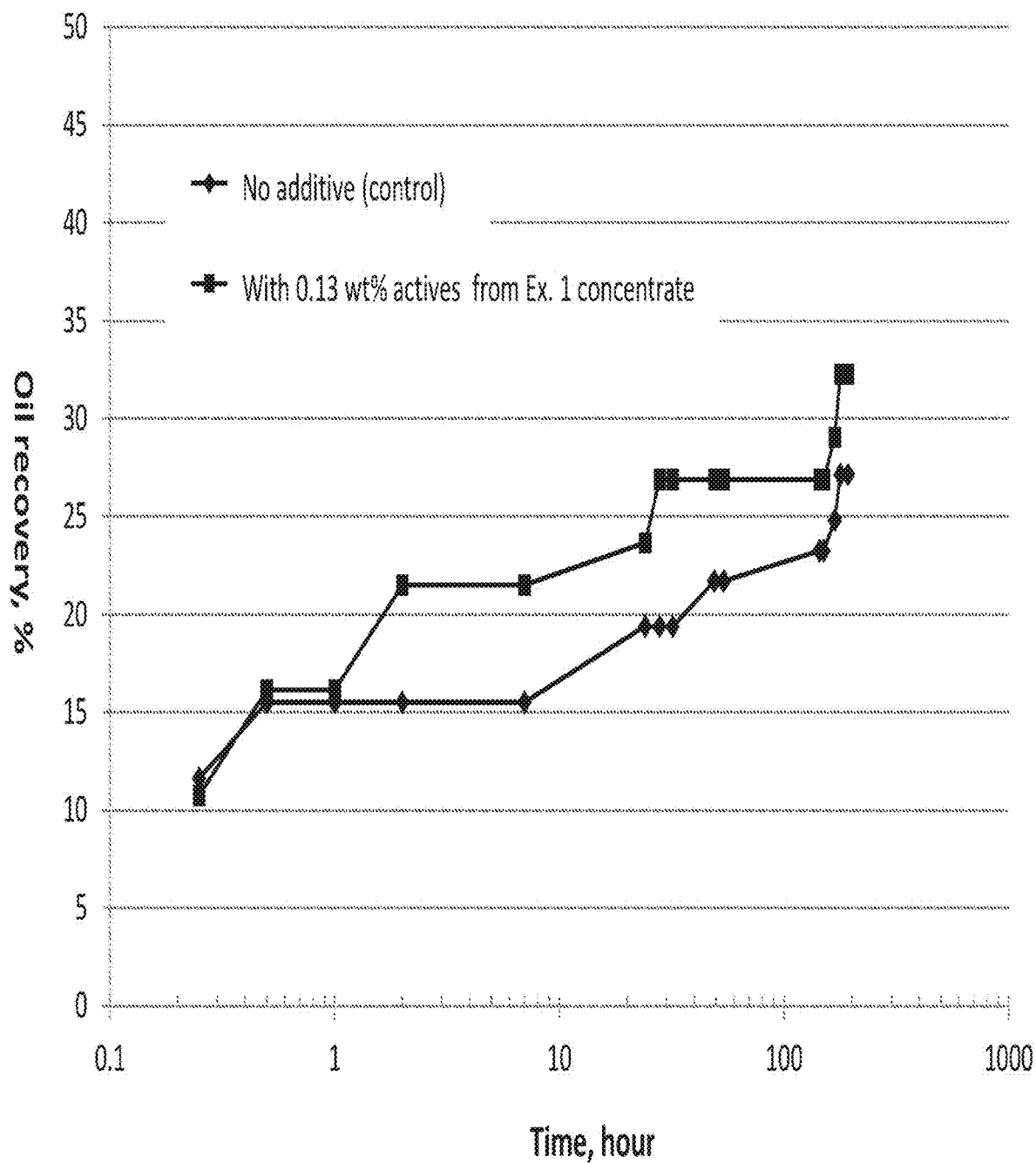
FIG. 2 is a plot of oil recovery as a function of time for a flowback injectate of the invention.

An oil-saturated plug was placed in the imbibition cell which was filled with the flowback injectate, then the imbibition cell was placed in a heated bath set at a temperature of 104° C. Displaced oil from the plug formed a separated liquid a layer on top of the imbibition cell, which was quantifiable as displaced volume. The cell was allowed to remain in the heated bath for 200 hours. The volume of oil measured was used to calculate the % Original Oil in Place (OOIP) oil recovery, which is the percent of oil volume measured in the test as a percent of the volume of oil taken up by the rock cores prior to initiation of the test. FIG. 2 is a plot of OOIP oil recovery as a function of time for the flowback injectate (0.13 wt % actives from the concentrate of Example 1).

The experiment was repeated with Woodford brine alone (no flowback concentrate added). The results are also presented in the plot of FIG. 2.

Example 5

A flowback concentrate was formed by combining 55 wt % ENORDET® 0332 (30 wt % actives; obtained from Royal Dutch Shell plc of the Hague, the Netherlands) and 19 wt % Mackam LHS-REMV (50% actives; C12 sultaine obtained from obtained from Solvay S. A. of Brussels, Belgium) in a 2:1 wt:wt mixture of ethylene glycol:methanol to provide a concentrate having 26 wt % total surfactant concentration. The concentrate was observed to be stable. A flowback injectate was then formed by diluting the concentrate to 1000 ppm total surfactant concentration using a 50/50 wt/wt mixture of synthetic brine (SB) and produced water (PW), wherein the dissolved solids (salts) in the SB and PW are shown in Table 2.

TABLE 2

Compositions of the synthetic brine and the produced water used in Example 5.

| Salts | Synthetic brine (SB) composition (g/l $H_2O$) | Produced water (PW) composition (g/l $H_2O$) |
|---|---|---|
| NaCl | 68.54 | 154.1 |
| $CaCl_2 \cdot 2H_2O$ | 4.0 | 8.8 |
| $MgCl_2 \cdot 6H_2O$ | 3.0 | 5.1 |
| KCl | 0.73 | 2.67 |
| $Na_2SO_4$ | 3.55 | 3.55 |
| $NaHCO_3$ | 0.55 | 0.63 |

An oil-saturated Canadian Bakken core was placed in the imbibition cell which was filled with a 50/50 wt/wt mixture of synthetic brine (SB) and produced water (PW) according to Table 2, then the imbibition cell was placed in a heated bath set at a temperature of 65° C. The cell was allowed to remain in the heated bath for 500 hours. The volume of oil measured was used to calculate the % Original Oil in Place (OOIP) oil recovery, which is the percent of oil volume measured in the test as a percent of the volume of oil taken up by the rock cores prior to initiation of the test.

After 500 hours, an amount of the flowback concentrate was added to the imbibition cell such that the resulting mixture included 1000 ppm total surfactant concentration. The test was continued for approximately 400 additional hours. FIG. 3 is a plot of OOIP oil recovery as a function of time in Example 5.

Example 6

Several mixtures of the synthetic brine (SB) and produced water (PW) according to Table 2 were made at different ratios, as shown in Table 3. Interfacial tension was measured by spinning drop tensiometer for some of these mixtures, and was found to be 9-10 mN/m at 65° C. over the entire range of mixtures, as shown in Table 3 (column showing 0 wt % actives).

Then the flowback concentrate of Example 5 was added to various mixtures of SB and PW at either 0.1 wt % (1000 ppm) or 0.5 wt % (5000 ppm) total surfactant concentration. Interfacial tension between the SB/PW mixtures including surfactant and Canadian Bakken oil was measured after equilibration to 65° C., and results of these measurements are shown in Table 3.

TABLE 3

Total dissolved solids calculated and interfacial tension at 65° C. measured for various SB/PW mixtures and the same mixtures having 0.5 wt % or 0.1 wt % actives of the flowback concentrate of Example 5, with Canadian Bakken oil.

| Wt % SB | Wt % PW | Total dissolved solids, ppm | Interfacial tension, mN/m at 65° C., 0 wt % actives | Interfacial tension, mN/m at 65° C., 0.5 wt % actives | Interfacial tension, mN/m at 65° C., 0.1 wt % actives |
|---|---|---|---|---|---|
| 100 | 0 | 73315 | 9 | 0.015 | 0.008 |
| 90 | 10 | 82198.5 | not measured | not measured | not measured |
| 80 | 20 | 91082 | not measured | 0.005 | not measured |
| 70 | 30 | 99965.5 | not measured | 0.004 | 0.007 |
| 60 | 40 | 108849 | not measured | 0.007 | 0.007 |
| 50 | 50 | 117732.5 | 9 | 0.010 | 0.007 |
| 40 | 60 | 126616 | not measured | not measured | 0.020 |
| 30 | 70 | 135499.5 | not measured | 0.037 | 0.040 |
| 20 | 80 | 144383 | not measured | not measured | not measured |
| 10 | 90 | 153266.5 | not measured | not measured | not measured |

TABLE 3-continued

Total dissolved solids calculated and interfacial tension at 65° C. measured for various SB/PW mixtures and the same mixtures having 0.5 wt % or 0.1 wt % actives of the flowback concentrate of Example 5, with Canadian Bakken oil.

| Wt % SB | Wt % PW | Total dissolved solids, ppm | Interfacial tension, mN/m at 65° C., 0 wt % actives | Interfacial tension, mN/m at 65° C., 0.5 wt % actives | Interfacial tension, mN/m at 65° C., 0.1 wt % actives |
|---|---|---|---|---|---|
| 0 | 100 | 162150 | 10 | not measured | 0.050 |

The results shown in Table 3 indicate that interfacial tension between oil and produced water having 7 wt % total dissolved solids, or even more than 16 wt % total dissolved solids is reduced from about 9-10 mN/m to less than 0.05 mN/m in the presence of 1000 ppm of a flowback concentrate according to the description.

We claim:

1. A method of increasing recovery of crude oil from a subterranean reservoir, the method comprising:
   (a) selecting an anionic surfactant comprising a sulfonate ion and a first hydrophobic portion;
   (b) selecting an amphoteric surfactant comprising a sulfonate ion and a second hydrophobic portion, wherein the first and second hydrophobic portions have a same or substantially a same chemical structure:
   (c) forming a flowback concentrate comprising the anionic surfactant, the amphoteric surfactant, a coupling agent or mixture thereof, and water, wherein the total amount of surfactants in the flowback concentrate is about 20 wt % to 50 wt % and the flowback concentrate does not include surfactants having internal carboxylate anionic moieties or internal carboxylic acid moieties;
   (d) forming a flowback injectate by combining about 99 wt % to 99.999 wt % a water source and about 0.001 wt % to 1 wt % the flowback concentrate;
   (e) injecting the flowback injectate into the subterranean reservoir; and
   (f) collecting a hydrocarbon from the subterranean reservoir.

2. The method of claim 1 wherein the subterranean reservoir is a tight shale reservoir.

3. The method of claim 1 wherein the water source is a high total dissolved solids water source, a high temperature water source, or a high total dissolved solids, high temperature water source.

4. The method of claim 1 wherein the combining is carried out contemporaneously with the injecting.

5. The method of claim 1, wherein the molar ratio of anionic surfactant to amphoteric surfactant in the flowback concentrate is about 1:2 to 3:1.

6. The method of claim 1, wherein the weight ratio of water to coupling agent in the flowback concentrate is about 1:10 to 1:2.

7. The method of claim 1, wherein the amphoteric surfactant is selected from the group consisting of lauryl sulfobetaine, caprylyl sulfobetaine, myristyl sulfobetaine, Sulfobetaine 10, Sulfobetaine 3-14, Sulfobetaine 3-10, lauryl hydroxysultaine, and myristamidopropyl hydroxysultaine.

8. The method of claim 1, wherein the method further comprises storing the flowback concentrate for one week to two years at temperatures between about 0° C. and 100° C., wherein the flowback concentrate is pumpable or pourable at temperatures between about 0° C. and 100° C.

9. A method of increasing recovery of crude oil from a subterranean reservoir, the method comprising:
   (a) selecting a surfactant pair including lauryl hydroxy sultaine and an anionic surfactant comprising a sulfonate group and a linear dodecyl chain with a hydroxyl group bonded to the dodecyl chain;
   (b) forming a flowback concentrate comprising the surfactant pair, a coupling agent, and water, wherein the total amount of surfactants in the flowback concentrate is about 20 wt % to 50 wt % and the flowback concentrate does not include surfactants having internal carboxylate anionic moieties or internal carboxylic acid moieties;
   (c) forming a flowback injectate by combining about 99 wt % to 99.999 wt % a water source and about 0.001 wt % to 1 wt % the flowback concentrate;
   (d) injecting the flowback injectate into the subterranean reservoir; and
   (e) collecting a hydrocarbon from the subterranean reservoir.

* * * * *